(12) United States Patent
Yu

(10) Patent No.: US 8,004,131 B2
(45) Date of Patent: Aug. 23, 2011

(54) STEPPING MOTOR

(75) Inventor: Hyun Soo Yu, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 106 days.

(21) Appl. No.: 12/446,961

(22) PCT Filed: Jun. 19, 2008

(86) PCT No.: PCT/KR2008/003479
§ 371 (c)(1),
(2), (4) Date: Apr. 23, 2009

(87) PCT Pub. No.: WO2008/156316
PCT Pub. Date: Dec. 24, 2008

(65) Prior Publication Data
US 2010/0013328 A1    Jan. 21, 2010

(30) Foreign Application Priority Data

Jun. 19, 2007 (KR) .................. 10-2007-0060129
Jan. 11, 2008 (KR) .................. 10-2008-0003310

(51) Int. Cl.
*H02K 7/00* (2006.01)
(52) U.S. Cl. ............ 310/71; 310/49.05; 310/89
(58) Field of Classification Search ........... 310/71, 310/49.05, 49.06, 257, 89
See application file for complete search history.

(56) References Cited

U.S. PATENT DOCUMENTS

| | | | |
|---|---|---|---|
| 5,845,390 A * | 12/1998 | Cheng et al. | 29/596 |
| 6,411,003 B1 * | 6/2002 | Sasaki et al. | 310/156.02 |
| 7,015,603 B2 * | 3/2006 | Barrho et al. | 310/49.34 |
| 7,151,333 B2 * | 12/2006 | Suzuki et al. | 310/71 |
| 7,348,696 B2 * | 3/2008 | Sonohara et al. | 310/49.08 |
| 2005/0046305 A1 * | 3/2005 | Matsushita et al. | 310/257 |
| 2008/0054764 A1 * | 3/2008 | Katada et al. | 310/49 R |
| 2008/0164784 A1 * | 7/2008 | Huang | 310/49 R |

FOREIGN PATENT DOCUMENTS

| | | |
|---|---|---|
| CN | 1801585 A | 7/2006 |
| CN | 1848630 A | 10/2006 |
| KR | 10-1999-0036376 A | 5/1999 |
| KR | 10-2006-0080862 A | 7/2006 |
| KR | 10-2007-0039467 A | 4/2007 |

OTHER PUBLICATIONS

Office Action dated Apr. 20, 2011 in Chinese Application No. 200880001099.X.

* cited by examiner

*Primary Examiner* — Dang D Le
(74) *Attorney, Agent, or Firm* — Saliwanchik, Lloyd & Eisenschenk

(57) ABSTRACT

A stepping motor includes: a rotating shaft; a rotor fixed to the rotating shaft; a terminal unit disposed at a side of the rotor, and having an external power supply applied thereto; a coil coupled to the terminal unit; and an outer yoke disposed in circumferential directions around outsides of the coil and the rotor to form magnetic pole portions, and disposed in a circumferential direction around an inside of the coil to increase an area through which magnetic flux flows.

11 Claims, 5 Drawing Sheets

[Fig. 1]
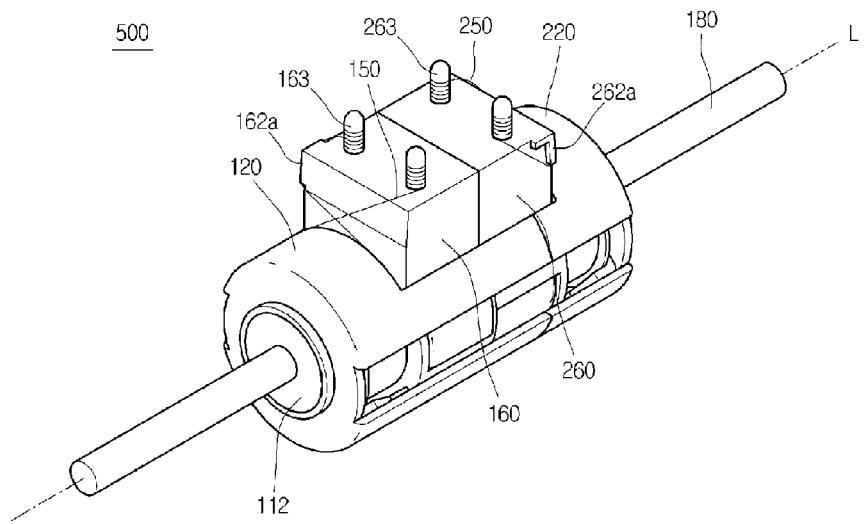
[Fig. 2]
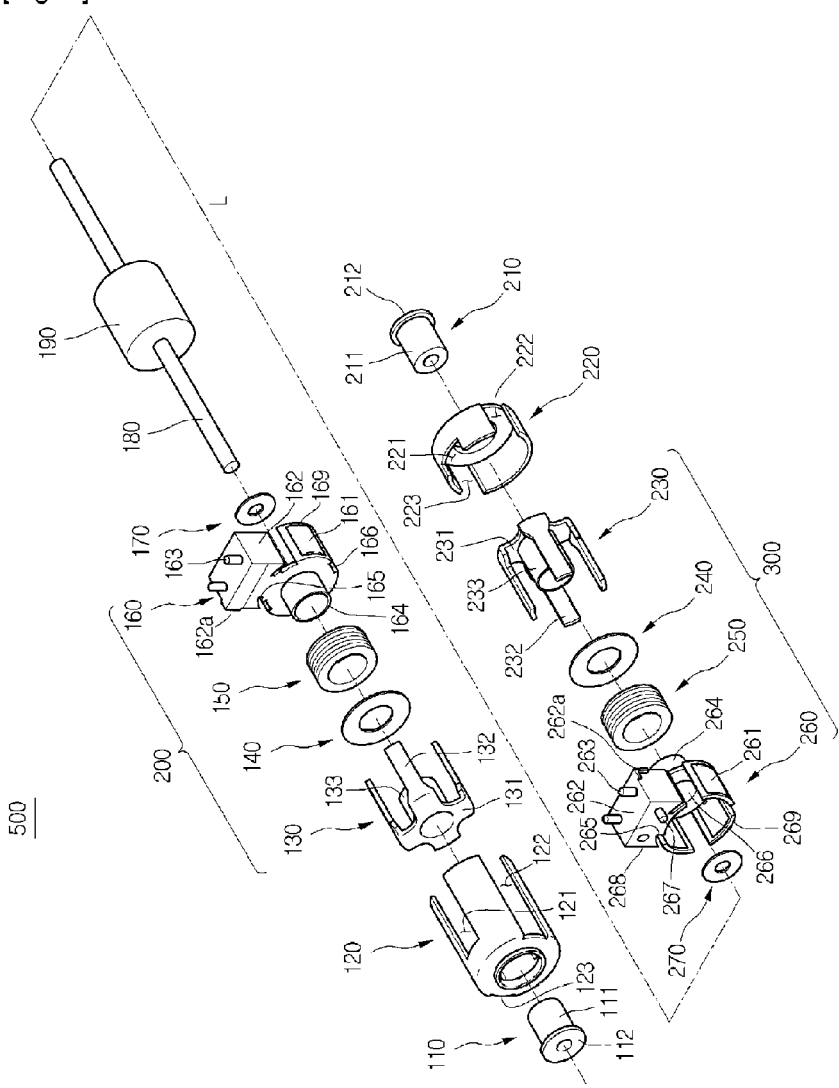

[Fig. 3]
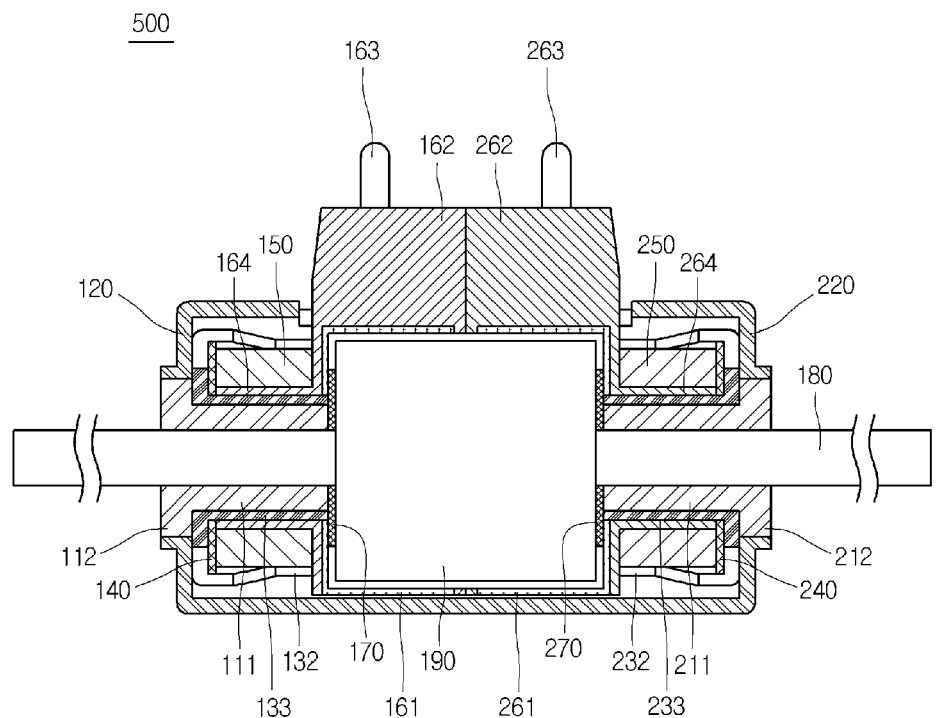
[Fig. 4]
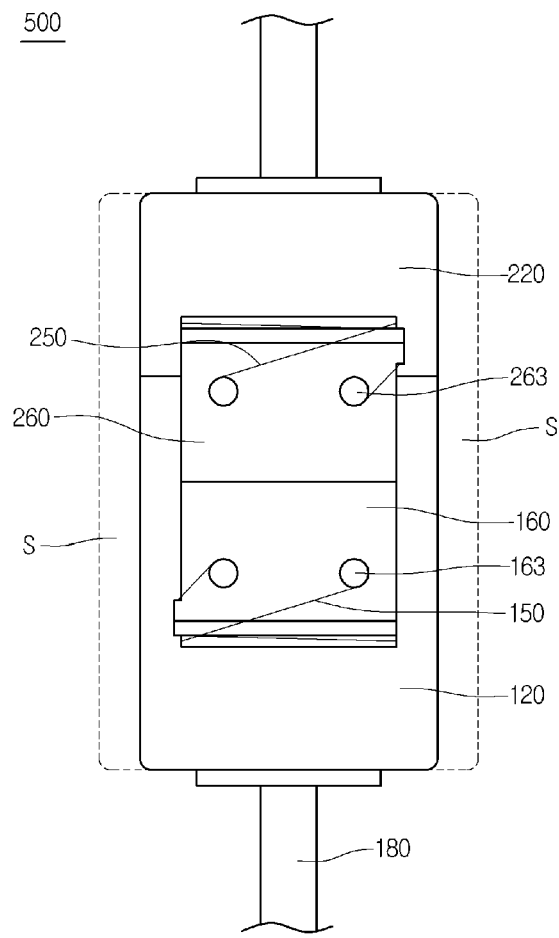

[Fig. 5]
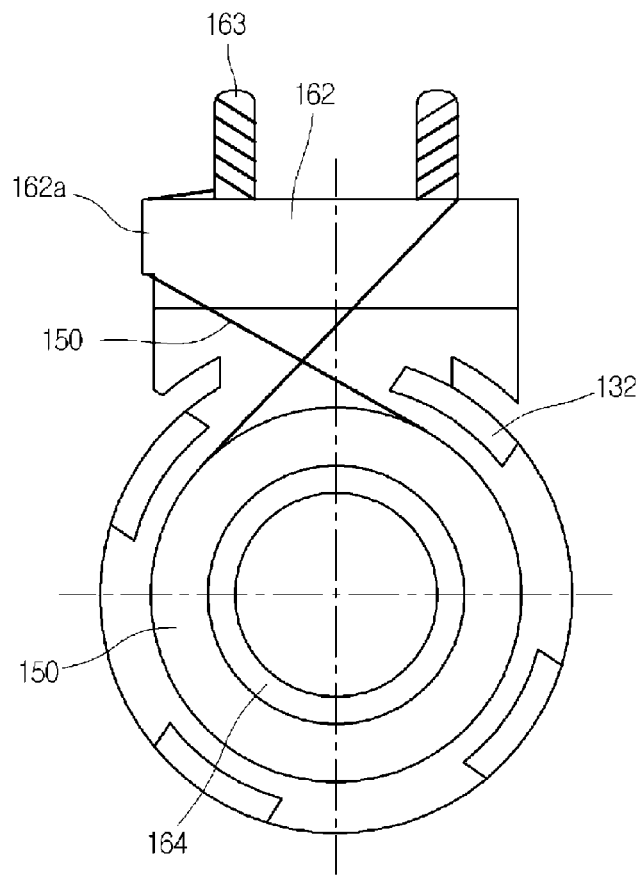
[Fig. 6]
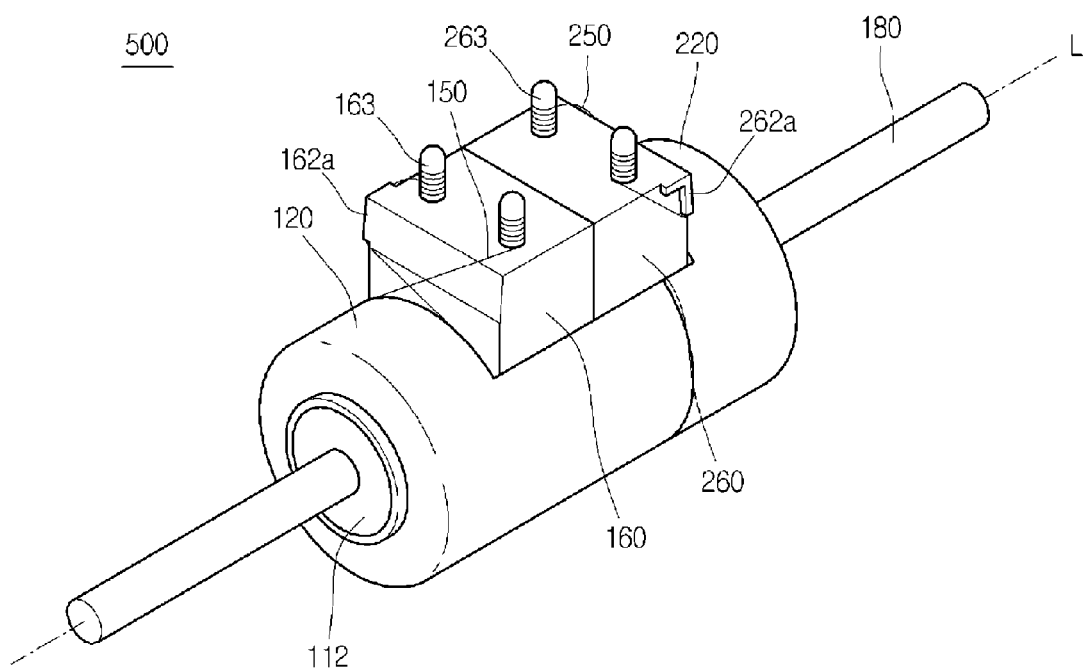

[Fig. 7]
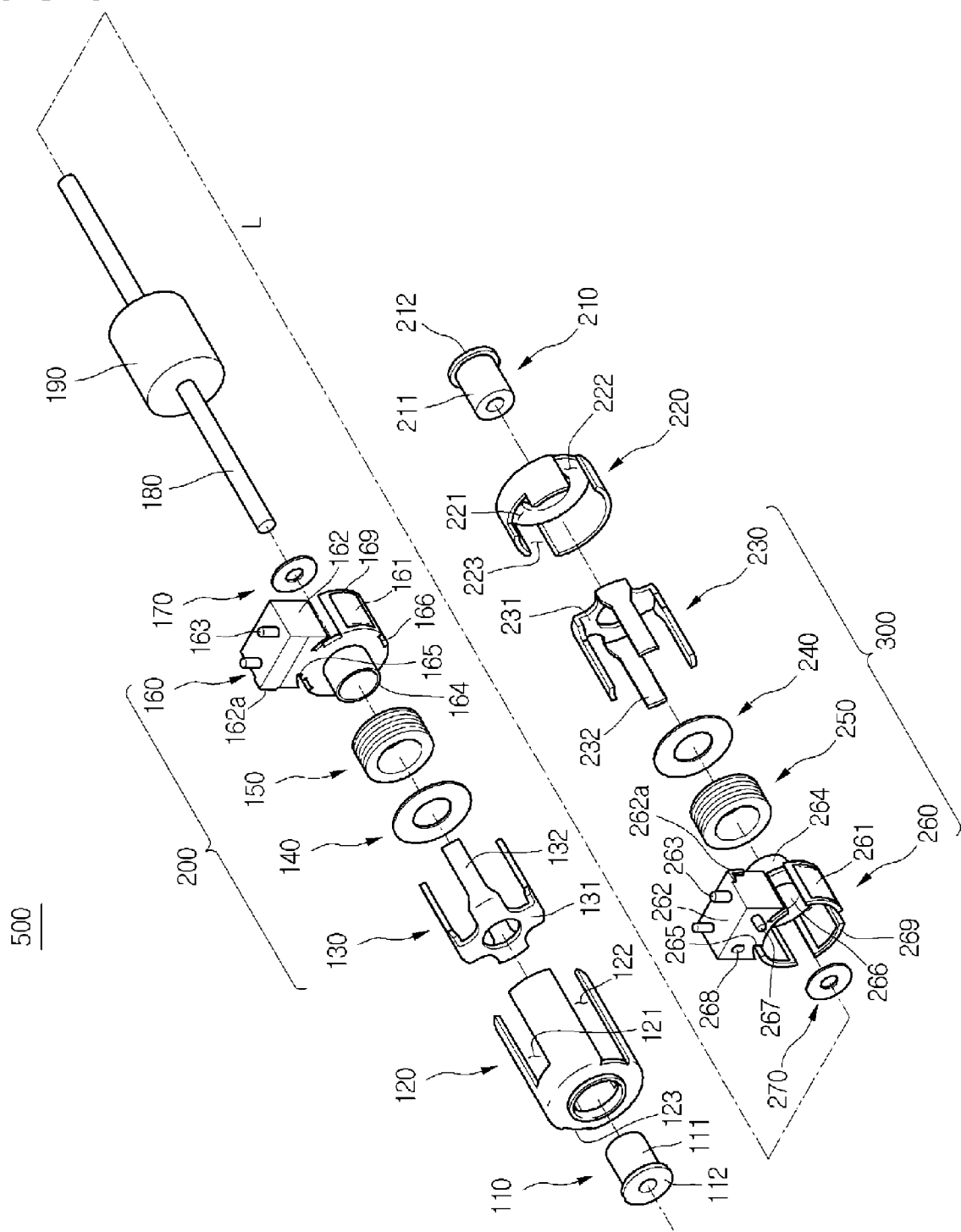

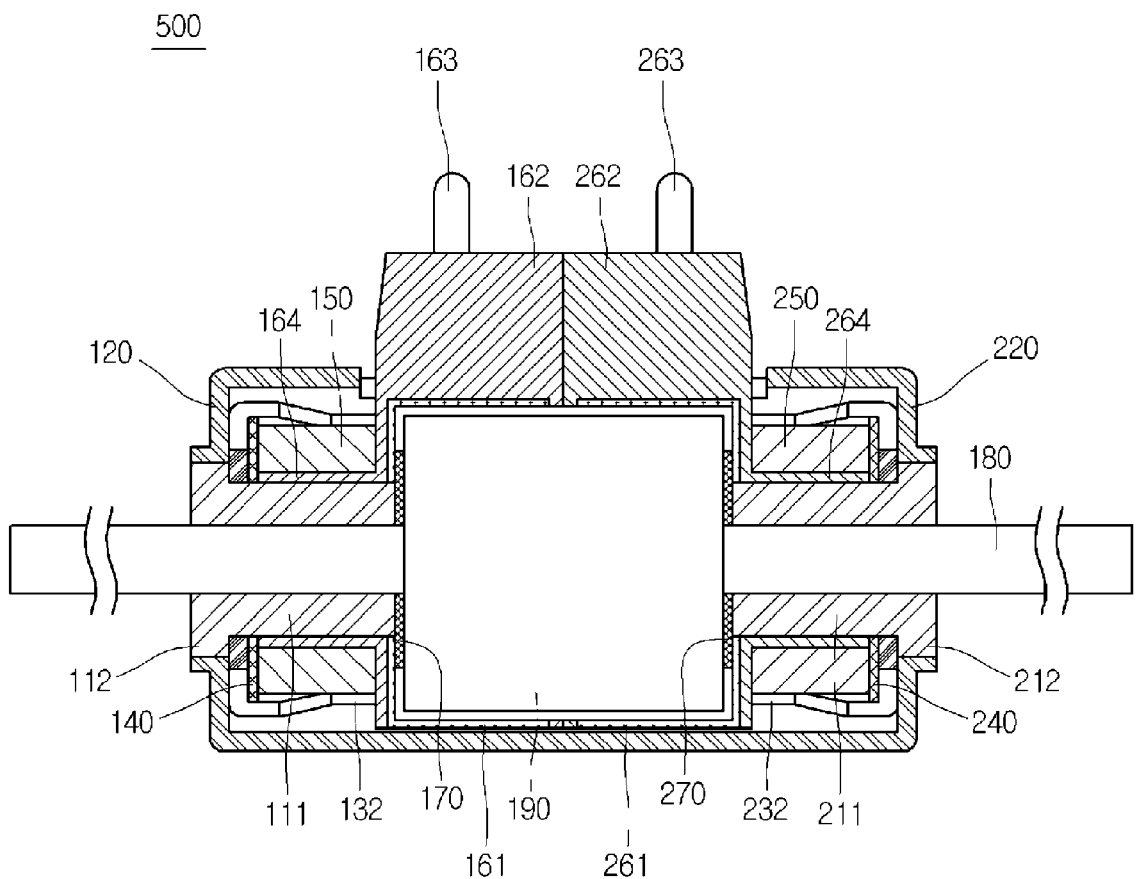
[Fig. 8]

STEPPING MOTOR

CROSS-REFERENCE TO RELATED APPLICATION

This application is the U.S. national stage application of International Patent Application No. PCT/KR2008/003479, filed Jun. 19, 2008, the disclosure of which is hereby incorporated by reference in its entirety.

TECHNICAL FIELD

Embodiments relate to a stepping motor.

BACKGROUND ART

A stepping motor is provided with a rotor fixed to a periphery of a rotating shaft, and a pair of stators disposed in an axial direction of the rotating shaft, with the rotor in between.

The stator includes coils that are parallelly installed to the rotor with respect to the axial direction of the rotating shaft, and a yoke for holding the coils.

The above stepping motor is applied for driving camera lenses and pickup lenses of media-related devices, and has applications in various other electronic devices.

DISCLOSURE OF INVENTION

Technical Problem

Embodiments provide a stepping motor.

Embodiments also provide a miniaturized stepping motor.

Embodiments further provide a stepping motor with increased torque through increasing the area in which magnetic flux flows.

Embodiments still further provide a stepping motor that prevents electronic and mechanical interference between a coil and yoke.

Embodiments yet further provide a stepping motor that is easy to manufacture and assemble, and which has low motor vibration and noise.

Technical Solution

In one embodiment, stepping motor includes: a rotating shaft; a rotor fixed to the rotating shaft; a terminal unit disposed at a side of the rotor, and having an external power supply applied thereto; a coil coupled to the terminal unit; and an outer yoke disposed in circumferential directions around outsides of the coil and the rotor to form magnetic pole portions, and disposed in a circumferential direction around an inside of the coil to increase an area through which magnetic flux flows.

In another embodiment, a stepping motor includes: a rotating shaft; a rotor fixed to the rotating shaft; a terminal unit disposed at a side of the rotor, and having an external power supply applied thereto; a coil coupled to the terminal unit; an outer yoke disposed in circumferential directions around outsides of the coil and the rotor to form magnetic pole portions; and a case disposed at an outside of the outer yoke, and defining a first open portion through which a portion of the terminal unit projects externally, and a second open portion disposed at a position apart from the first open portion in a circumferential direction.

Advantageous Effects

Embodiments can provide a stepping motor.

Embodiments can also provide a miniaturized stepping motor.

Embodiments can further provide a stepping motor with increased torque through increasing the area in which magnetic flux flows.

Embodiments can still further provide a stepping motor that prevents electronic and mechanical interference between a coil and yoke.

Embodiments can yet further provide a stepping motor that is easy to manufacture and assemble, and which has low motor noise and vibration.

BRIEF DESCRIPTION OF THE DRAWINGS

FIG. 1 is a perspective view of a stepping motor according to a first embodiment.

FIG. 2 is an exploded perspective view of a stepping motor according to the first embodiment.

FIG. 3 is sectional perspective view of a stepping motor according to the first embodiment.

FIG. 4 is a view of a stepping motor according to the first embodiment as seen from above.

FIG. 5 is a view showing a first coil electrically connected to a terminal in a stepping motor according to the first embodiment.

FIG. 6 is a perspective view of a stepping motor according to a second embodiment.

FIG. 7 is an exploded perspective view of a stepping motor according to a third embodiment.

FIG. 8 is a sectional view of a stepping motor according to the third embodiment.

MODE FOR THE INVENTION

Below, a stepping motor according to embodiments will be described in detail with reference to the attached drawings.

FIG. 1 is a perspective view of a stepping motor according to a first embodiment, FIG. 2 is an exploded perspective view of a stepping motor according to the first embodiment, and FIG. 3 is sectional perspective view of a stepping motor according to the first embodiment.

Referring to FIGS. 1 to 3, a stepping motor 500 according to embodiments is formed in an overall cylindrical shape, has a miniature size, so that it can be applied for driving camera lenses in mobile devices and pickup lenses in media-related devices, and can be applied in various other electronic devices.

The stepping motor 500 has a rotor 190 formed of permanent magnets with alternatingly magnetized N-poles and S-poles at uniform intervals in a radial direction around the periphery of the rotating shaft 180.

A pair of first and second stators 200 and 300 is disposed at the front and rear of the rotor 190 in an axial direction (L) of the rotating shaft 180.

Also, first and second washers 170 and 270 are installed on the rotating shaft 180 and disposed between a side of the rotor 190 and the front end of the first stator 200, and between the other side of the rotor 190 and the rear end of the second stator 300.

The first stator 200 includes a first coil 150 and a first yoke that holds the first coil 150, to form an electromagnetic circuit. The first yoke includes a first outer yoke 130 and a first inner yoke 161 made of iron.

The first outer yoke 130 and the first inner yoke 161 are connected to form the electromagnetic circuit through a sleeve 111 of a first bearing 110 for rotatably supporting the rotating shaft 180. Because the first bearing 110 is press-fitted in the first case 120 and is press-fitted in or supports the first outer yoke 130 and the first inner yoke 161, a structure is thus formed with coaxial alignment and noise reduction.

The first outer yoke 130 includes a base portion 131 of a circular plate shape, and four outer magnetic pole portions 132 and cylindrical yokes 133 extending in the axial direction (L) from the edges of the base portion 131. The cylindrical yokes 133 have increased areas through which magnetic flux flows to reduce magnetic resistance and increase torque of the stepping motor 500.

The first inner yoke 161 is fixedly coupled to a first terminal unit 160, and extends in the axial direction (L) to form 4 inner magnetic pole portions.

The first inner yoke 161 is formed integrally with the first terminal unit 160 by being insert molded therein or by being coupled into the space formed within the first terminal unit 160, so that assembly process of the first inner yoke 161 can be performed with simplicity. When the rotor 190 operates, oscillation of the first inner yoke 161 and the first outer yoke 130 due to cogging torque can be prevented, so that noise and vibration can be reduced. This also applies to a second inner yoke 261 described below.

In particular, the first inner yoke 161 does not need separate positioning in a radial direction.

The first yoke is disposed proximate to the first coil 150, the base portion 131 of the first outer yoke 130 is disposed to the outside of the first coil 150 in an axial direction (L), and the cylindrical yokes 133 of the first outer yoke 130 are disposed between the first coil 150 and the rotating shaft 180. Also, a first insulating member 140 that is inserted over the rotating shaft 180 is formed between the base portion 131 and the first coil 150.

The outer magnetic pole portion 132 and the first inner yoke 161 are disposed in approximately the same circumference to encircle the rotor 190.

Thus, in the stepping motor 500 according to embodiments, because the first coil 150 and the rotor 190 are installed concentrically in the axial direction (L), the outer circumference of the stepping motor 500 can be reduced.

Also, terminals 163 projecting from a resin block portion 162 of the first terminal unit 160 are electrically connected to the first coil 150.

The first coil 150 is formed as a concentric coil, and is supported by a resin bobbin 164 formed integrally with the block portion 162 of the first terminal unit 160. Current is supplied from an external power source to the first coil 150 through the terminals 163 of the first terminal unit 160.

In the first embodiment, a first protruding portion 162*a* is formed on a side of the block portion 162. FIG. 5 is a configurative diagram of a stepping motor according to the first embodiment, showing the electrical connection between a first coil to terminals, and as shown in FIGS. 1 to 5, when the first coil 150 is connected to the terminals 163, the first protruding portion 162*a* alters the route in which the first coil 150 is disposed, so that the first coil 150 can be prevented from being electrically connected to the outer magnetic pole portion 132.

Next, because the structure of the second stator 300 is the same as that of the first stator 200, a brief description of the second stator 300 will be provided.

The second stator 300 includes a second coil 250, and a second yoke holding the second coil 250 to form an electromagnetic circuit. The second yoke includes a second outer yoke 230 and a second inner yoke 261 made of iron.

The second outer yoke 230 and the second inner yoke 261 are connected in an electromagnetic circuit through a sleeve 211 of a second bearing 210. Because the second bearing 210 is press fitted in a second case 220 and is press fitted in or supports the second outer yoke 230 and the second inner yoke 261, a structure with co-axial integrity and minimal noise can be formed.

The second outer yoke 230 has a circular plate-shaped base portion 231, and four magnetic pole portions 232 and cylindrically-shaped cylindrical yokes 233 that extend in a comb-like configuration from the edge of the base portion 231 in an axial direction (L). The cylindrical yokes 233 have increased areas through which magnetic flux flows, to reduce magnetic resistance and increase the torque of the stepping motor 500.

Also, a second yoke is disposed proximately to the second yoke 250, the base portion 231 of the second outer yoke 230 is disposed to the outside of the second coil 250 in the axial direction (L), and the cylindrical yokes 233 of the second outer yoke 230 are disposed between the second coil 250 and the rotating shaft 180. Also, a second insulating member 240 is formed between the base portion 231 and the second coil 250 to insert over the rotating shaft 180.

The second inner yoke 261 is fixedly coupled to a second terminal unit 260 forming four inner magnetic pole portions extending in the axial direction (L).

Also, terminals 263 protruding from a resin block portion 262 of the second terminal unit 260 are electrically connected to the second coil 250.

The second coil 250 is formed as a concentric coil, and is supported on a resin bobbin 264 formed integrally with the block portion 262 of the second terminal unit 260. Also, current from an external power supply is supplied through the terminals 163 of the second terminal unit 260 to the second coil 250.

According to the first embodiment, a second protruding portion 262*a* is formed at a side of the block portion 262. As shown in FIG. 1, when the second coil 250 is connected to the terminals 263, the second protruding portion 262*a* is formed to latch on the second coil 250 to change the route of the latter's disposition so that the second coil 250 is prevented from being electrically connected to the outer magnetic portion 132.

The magnetic pole portions 132, 161, 232, and 261 are disposed facing the outer periphery of the rotor 190 in the first and second stators 200 and 300, and the outer magnetic pole portion 132 of the first stator 200 and the outer magnetic pole portion 232 of the second stator 300 do not align with each other in the axial direction (L), but are offset from each other by a predetermined angle.

Also, the inner yoke 161 of the first stator 200 and the inner yoke 261 of the second stator 300 are offset from each other by a predetermined angle.

The direction of current flowing through the first and second terminal units 160 and 260 to the first and second coils 150 and 250 is sequentially alternated, so that the rotor 190 can be rotated in steps, and thus, the rotating shaft 180 can also be rotated in steps.

Also, the stepping motor 500 according to the first embodiment includes non-magnetic cases 120 and 220 that receive the pair of stators 200 and 300 and the rotor 190.

The cases 120 and 220 include a first case 120 and a second case 220, and may be formed of a stainless steel material.

A first open portion 121 and second and third open portions 122 and 123 facing one another are defined in the first case 120 to extend in the axial direction (L).

The first open portion 121 is formed of a length less than the overall length of the first case 120, and is formed of a length equal to a combined length of the resin block portions 162 and 262 of the first and second terminal units 160 and 260 in the axial direction (L), or a length less than the combined length of the resin block portions 162 and 262 of the first and second terminal units 160 and 260 in the axial direction (L).

The first open portion 121 is inserted around the first and second terminal units 160 and 260. Case inserting recesses 165 and 265 are formed in the first and second terminal units 160 and 260, so the first and second terminal units 160 and 260 are inserted in the axial direction (L), with the first open portion 121 inserted in the case inserting recesses 165 and 265.

The first and second terminal units 160 and 260 are externally exposed through the first open portion 121 and electrically connected to an external power supply.

When the first open portion 121 is coupled to the first terminal unit 160, it can be circumferentially positioned.

Regarding the second case 220, a first open portion 221 corresponding to the first open portion 121 of the first case 120 is formed therein.

The sum of the lengths of the first open portion 121 of the first case 120 and the first open portion 221 of the second case 220 in the axial direction (L) is slightly greater than the sum of the lengths of the resin block portions 162 and 262 of the first and second terminal unit 160 and 260 in the axial direction (L).

Here, when the length of the first open portion 121 of the first case 120 is greater than the sum of the lengths of the resin block portions 162 and 262 of the first and second terminal units 160 and 260 in the axial direction (L), the first open portion 221 of the second case 220 may not be formed.

The length of the first open portion 221 of the second case 220 may be formed shorter than the length of the first open portion 121 of the first case 120. Also, the circumferential position of the first open portion 221 of the second case 220 is determined when it is coupled to the second terminal unit 260. Here, the respective lengths of the first open portions 121 and 221 of the first and second cases 120 and 220 may be formed to have a reciprocally proportional relation.

Accordingly, the first coil 150 and the second coil 250 are extracted through gaps between the first open portion 121 of the first case 120 and the first open portion 221 of the second case 220, and the resin block portions 162 and 262 of the first and second terminal units 160 and 260, and are connected to the terminals 163 and 263.

The rotating shaft 180 is rotatably supported by the first and second bearings 110 and 210. The first and second bearings 110 and 210 are provided with body portions 112 and 212 with circular plate shapes, and sleeves 111 and 211 that extend from the body portions 112 and 212 in the axial direction (L).

The body portions 112 and 212 are coupled to the first case 120 and the second case 220, respectively, and the sleeves 111 and 112 are coupled to the first and second outer yokes 130 and 230, the first and second insulating members 140 and 240, the first and second coils 150 and 250, and the first and second terminal units 160 and 260, and contact the first and second washers 170 and 270.

Mutually facing surfaces of the block portions 162 and 262 of the first and second terminal units 160 and 260 respectively form a protrusion 267 and a hole 268. Accordingly, a protrusion (not shown) formed on the first terminal unit 160 is inserted and coupled in the hole 268 formed in the second terminal unit 260, and the protrusion 267 formed on the second terminal unit 260 is inserted and coupled in a hole (not shown) formed in the first terminal unit 160.

Further, magnetic pole portion coupling recesses 166 and 266 are formed in the first and second terminal units 160 and 260. The magnetic pole portion coupling recesses 166 and 266 are formed in quadruplicate in the first and second terminal units 160 and 260 at corresponding positions, such that they can be coupled with the outer magnetic pole portions 132 and 232 of the first and second outer yokes 130 and 230.

The magnetic pole portion coupling recesses 166 and 266 are able to determine the circumferential coupling positions of the first and second outer yokes 130 and 230.

Also, a first protruding portion 169 and a second protruding portion 269 are formed respectively at portions of the first and second terminal units 160 and 260 at which the first and second outer yokes 161 and 261 are installed.

The first protruding portions 169 and the second protruding portions 269 allow the first and second terminal units 160 and 260 to precisely engage and couple to one another.

FIG. 4 is a diagram of a stepping motor 500 according to the first embodiment when viewed from above.

The second and third open portions 122 and 123 are minimized in size in terms of their lengths perpendicular to the axial direction (L) of the stepping motor 500.

The second case 220 defines second and third open portions 222 and 223 corresponding to the second and third open portions 122 and 123.

Specifically, as shown in FIG. 4, according to how the second and third open portions 122 and 123 are formed, the diameter of the stepping motor 500 can be minimized, so that the space (S) occupied by the stepping motor 500 can be reduced.

When considering that the stepping motor 500 according to the first embodiment can be applied to mobile terminals, personal digital assistants (PDAs), and other electronic devices when manufactured in a small size, reducing its diameter through the second and third open portions 122 and 123 is a crucial factor that consequently increases design freedom in electronic devices.

Accordingly, the stepping motor 500 according to the first embodiment forms open portions in the cases to promote miniaturization and provide a configuration that is easy to manufacture and assemble.

FIG. 6 is a perspective view of a stepping motor 500 according to a second embodiment.

When comparing FIGS. 1 and 4, a stepping motor 500 according to the second embodiment does not have second and third open portions 122, 123, 222, and 223 formed in the first case 120 and the second case 220.

Accordingly, as shown in FIG. 4, while the space (S) consumed by the stepping motor 500 is not reduced, infiltration of impurities through second and third open portions 122, 123, 222, and 223 can be prevented.

FIG. 7 is an exploded perspective view of a stepping motor according to a third embodiment, and FIG. 8 is a sectional view of a stepping motor according to the third embodiment.

A stepping motor 500 according to the third embodiment is similar to a stepping motor according to the first embodiment described with reference to FIGS. 2 and 3. Thus, repetitive descriptions of the first embodiment will not be provided.

The stepping motor 500 according to the third embodiment, when compared to that of the first embodiment, is different in that the cylindrical yokes 133 are not formed on the first outer yoke 130, and the cylindrical yokes 233 are not formed on second outer yoke 230.

In this case, because the cylindrical yokes 133 and 233 are not formed, while magnetic resistance may be increased compared to the first embodiment, the manufacturing of the first outer yoke 130 and the second outer yoke 230 is made easier.

Although descriptions of specific embodiments have been provided above, it should be understood that the descriptions are only exemplary and in no way limit the present disclosure, and that numerous other modifications and embodiments not exemplified above and that fall within the main principles of present embodiments can be devised by those skilled in the art. For example, various modifications can be made to the respective component parts specifically depicted in embodiments. Also, it will be understood that such modifications and related differences in applications shall fall within the spirit and scope of the present disclosure defined in the appended claims.

INDUSTRIAL APPLICABILITY

Embodiments may be applied to a stepping motor.

The invention claimed is:
1. A stepping motor comprising:
    a rotating shaft;
    a rotor fixed to the rotating shaft;
    a terminal unit disposed at a side of the rotor, and having an external power supply applied thereto;
    a coil coupled to the terminal unit;
    an outer yoke disposed in circumferential directions around outsides of the coil and the rotor to form magnetic pole portions; and
    a case disposed at an outside of the outer yoke, and defining a first open portion through which a portion of the terminal unit projects externally, and a second open portion disposed at a position apart from the first open portion in a circumferential direction.
2. The stepping motor according to claim 1, wherein the case further defines a third open portion disposed in the circumferential direction to face the second open portion.
3. The stepping motor according to claim 1, further comprising a bearing coupled at either side in an axial direction of the case, for rotatably supporting the rotating shaft.
4. The stepping motor according to claim 1, wherein the case comprises a first case and a second case, at least one of the first case and the second case coupled to a case inserting recess formed in the terminal unit.
5. The stepping motor according to claim 1, further comprising an inner yoke integrally formed with the terminal unit and disposed in the circumferential direction around the outside of the rotor.
6. The stepping motor according to claim 1, wherein the coil is installed parallel to the rotor along an axial direction of the rotating shaft.
7. The stepping motor according to claim 1, wherein the outer yoke comprises:
    a base portion through which the rotating shaft passes; and
    an outer magnetic pole portion extending from the base portion in an axial direction of the rotating shaft to be disposed circumferentially around the outsides of the coil and the rotor.
8. The stepping motor according to claim 7, wherein the outer yoke further comprises a cylindrical yoke extending from the base portion in the axial direction of the rotating shaft to be disposed circumferentially around the inside of the coil.
9. The stepping motor according to claim 1, wherein the terminal unit comprises:
    a block portion comprising a terminal; and
    a bobbin integrally formed with the block portion to support the coil.
10. The stepping motor according to claim 9, wherein the block portion defines a protruding portion, and the coil is passed by the protruding portion to be electrically connected with the terminal.
11. A stepping motor comprising:
    a rotating shaft;
    a rotor fixed to the rotating shaft;
    a terminal unit disposed at a side of the rotor, and having an external power supply applied thereto;
    a coil coupled to the terminal unit;
    an outer yoke disposed in circumferential directions around outsides of the coil and the rotor to form magnetic pole portions, and disposed in a circumferential direction around an inside of the coil to increase an area through which magnetic flux flows;
    a case disposed at an outside of the outer yoke; and
    a bearing coupled at either side in an axial direction of the case, for rotatably supporting the rotating shaft,
    wherein the outer yoke comprises: a base portion; an outer magnetic pole portion extending from the base portion in an axial direction of the rotating shaft to be disposed circumferentially around the outsides of the coil and the rotor; and a cylindrical yoke extending from the base portion in the axial direction of the rotating shaft to be disposed circumferentially around the inside of the coil,
    wherein the bearing comprises: a body portion with circular plate shape; and a sleeve extended from the body portion in the axial direction of the rotating shaft, and
    wherein the sleeve is disposed between the cylindrical yoke and the rotating shaft, and wherein an inner circumference of the sleeve contacts the rotating shaft and an outer circumference of the sleeve contacts the cylindrical yoke.

* * * * *